United States Patent

Kim

[11] Patent Number: 6,064,499
[45] Date of Patent: May 16, 2000

[54] COLOR REGISTRATION ADJUSTING METHOD IN IMAGE FORMING APPARATUS USING AN EDGE FORMING ALGORITHM

[75] Inventor: Nam-ryoung Kim, Suwon, Rep. of Korea

[73] Assignee: Samsung Electronics Co., Ltd., Kyungki-do, Rep. of Korea

[21] Appl. No.: 09/126,594

[22] Filed: Jul. 31, 1998

[30] Foreign Application Priority Data

Aug. 1, 1997 [KR] Rep. of Korea ...................... 97-36871

[51] Int. Cl.[7] ............................................ H04N 1/46
[52] U.S. Cl. .......................... 358/505; 358/500; 358/474
[58] Field of Search ................................. 358/500, 505, 358/474, 400, 473, 509; 346/108, 1.1, 140, 157, 160

[56] References Cited

U.S. PATENT DOCUMENTS

| | | | |
|---|---|---|---|
| 5,381,165 | 1/1995 | Lofthus | 346/108 |
| 5,444,469 | 8/1995 | Cowger | 347/14 |
| 5,587,771 | 12/1996 | Mori et al. | 355/208 |

FOREIGN PATENT DOCUMENTS

| | | | |
|---|---|---|---|
| 0 679 018 | 10/1995 | European Pat. Off. | H04N 1/50 |
| 4-9975 | 1/1992 | Japan | G03G 15/04 |
| 4-131874 | 5/1992 | Japan | G03G 15/01 |
| 4-198965 | 7/1992 | Japan | G03G 15/04 |
| 4-251874 | 9/1992 | Japan | G03G 15/01 |
| 4-277772 | 10/1992 | Japan | G03G 15/04 |
| 4-301661 | 10/1992 | Japan | G03G 15/01 |
| 4-321066 | 11/1992 | Japan | G03G 15/01 |
| WO 97/19388 | 5/1997 | WIPO | G03G 15/01 |

*Primary Examiner*—Jerome Grant, II
*Assistant Examiner*—Negussie Workel
*Attorney, Agent, or Firm*—Sughrue, Mion, Zinn, Macpeak & Seas, PLLC

[57] ABSTRACT

A color registration adjusting method in an image forming apparatus includes the steps of determining whether the detected pulse width for the edge of a photoreceptor belt is smaller than the expected pulse width thereof. If the detected pulse width is smaller than the expected pulse width, then the detected pulse width is set as a scanning start signal (an edge signal mixed) and a value obtained by subtracting a predetermined value from the currently expected pulse width is set as the next expected pulse width. Alternatively, if the detected pulse width is greater than or equal to the expected pulse width in the first step, the expected pulse width is set as the scanning start signal and a determination is made whether the counted value of a pulse is smaller than an offset value. If the pulse counted value is smaller than the offset value in the step, a value obtained by subtracting a predetermined value from the currently expected pulse width is set as the next expected pulse width. Alternatively, if the pulse counted value is greater than or equal to the offset value, a value obtained by adding a predetermined value to the currently expected pulse width is set as the next expected pulse width. Since some of the next expected pulse widths are determined by comparing the pulse counted value and offset value, the mis-registration of color in the main scanning direction of a laser beam can be adjusted quantitatively.

4 Claims, 3 Drawing Sheets

COLOR REGISTRATION ADJUSTING METHOD IN IMAGE FORMING APPARATUS USING AN EDGE FORMING ALGORITHM

BACKGROUND OF THE INVENTION

1. Field of the Invention

The present invention relates to a color registration adjusting method in an image forming apparatus, and more particularly, to a color registration adjusting method in an image forming apparatus for electronically adjusting color registration of a main scanning direction using an edge forming algorithm of a photoreceptor belt.

The present application is based upon Korean Application No. 97-36871, which is incorporated herein by reference.

2. Description of the Related Art

An image forming apparatus reproduces characters or images onto a recording medium according to transferred characters or image data signals, and generally includes a photoreceptor member (e.g., a photoreceptor drum or a photoreceptor belt) for forming a latent electrostatic image, a charging unit for charging the photoreceptor member, an exposing unit for forming a latent electrostatic image having a predetermined pattern by scanning light on the charged photoreceptor member, a developing unit for developing the latent electrostatic image by supplying a developing medium, e.g., a toner or a developer liquid, on the exposed latent electrostatic image, and a transfer member for transferring the developed image to the recording medium by applying pressure or heat.

FIG. 1 is a schematic diagram of a general image forming apparatus.

Referring to FIG. 1, the general image forming apparatus includes a photoreceptor belt 104 installed to be capable of circulating around first, second and third belt rollers 101, 102 and 103, a discharger 105 for removing charges remaining on the photoreceptor belt 104, a charger 106 for newly generating charges on the photoreceptor belt 104, exposure units 107, 108, 109 and 110 each having a laser scanning unit (not shown) which scans a laser beam across the photoreceptor belt 104 to selectively discharge the image forming portion of the photoreceptor belt 104 to be formed into an image shaped pattern, development units 111, 112, 113 and 114 for developing the latent electrostatic image formed on the photoreceptor belt 104 using a developer liquid, a drying unit 115 for drying the developer liquid supplied to the latent image, and a transfer unit 116 for transferring a developed image formed on the photoreceptor belt 104 to a recording medium 117 such as a recording sheet or a film.

Here, the development unit 111 includes a development roller 111a for coating the developer liquid on the photoreceptor belt 104, a developer liquid supplier 111b for supplying the developer liquid to the development roller 111a, a cleaning roller 111c for eliminating the developer liquid embedded on the rear surface of the development roller 111a, first and second squeegee rollers 111d and 111e for eliminating the developer liquid remaining on the photoreceptor belt 104, first and second blades 111f and 111g for eliminating the developing embedded on the first and second squeegee rollers 111d and 111e, and a developer liquid recovery reservoir 111h for recovering the developer liquid removed by the cleaning roller 111c and the blades 111f and 111g. The drying unit 115 includes a heating roller 115h for drying the developer liquid embedded on the photoreceptor belt 104. The transfer unit 116 includes a transfer roller 116t closely pressing against and rotating relative to the first belt roller 101 with the photoreceptor belt 104 interposed therebetween for receiving the image on the photoreceptor belt 104, and a fixing roller 116p closely pressing against and rotating relative to the transfer roller 116t, for fixing the image transferred to the transfer roller 116t onto the recording sheet 117.

In the image forming apparatus having the aforementioned configuration, error factors related to laser beam scanning will be described.

First, the state of the respective edge detectors for colors Y (yellow), M (magenta), C(cyan) and K (black), provided in the photoreceptor belt 104, will be described. As shown in FIG. 2, based on a Y-belt edge detector 201, the respective M-, C- and K-belt edge detectors 202, 203 and 204 are not aligned along a straight line. Thus, an error is generated by the scanning of the laser beam. In this case, if the resolution of the main scanning direction, i.e., perpendicular to the traveling direction of the photoreceptor belt, is 600 dpi, the precision in the installation (arrangement) of the belt edge detectors must be at least within $\frac{1}{600}$ inch. If the amount of mis-registration of color is intended to be within $\frac{1}{5}$ of a pixel, the precision in the arrangement of the Y-, M-, C- and K-belt edge detectors along a line must be within $1/(5\times600)$ inch. However, it is almost impossible to adjust the detectors mechanically with such precision. Thus, the detectors must be adjusted electronically.

Next, as shown in FIG. 3, the respective scanners 301, 302, 303 and 304 for colors Y, M, C and K are not aligned along a straight line, which causes an error in scanning a laser beam. This is also very difficult to correct mechanically.

Another error factor in the laser beam scanning is belt weaving. Even when the photoreceptor belt 104 is steered while being driven, variance is generated in the main scanning direction, which causes an error in scanning a laser beam.

Finally, a defect of the photoreceptor belt 104 itself may be involved in the error related to the laser beam scanning. In other words, if the edges of the photoreceptor belt 104 are not straight, an error is generated in scanning the laser beam across the photoreceptor belt.

The above-described error factors cannot be corrected mechanically, and must be corrected electronically, instead.

SUMMARY OF THE INVENTION

To solve the above problems, it is an objective of the present invention to provide a color registration adjusting method in an image forming apparatus for electronically adjusting color registration of a main scanning direction using an edge forming algorithm of a photoreceptor belt.

Accordingly, to achieve the above objective, there is provided a color registration adjusting method in an image forming apparatus comprising the steps of: (a) discriminating whether the detected pulse width for the edge of a photoreceptor belt is smaller than the expected pulse width thereof; (b) setting the detected pulse width as a scanning start signal (an edge signal mixed) if the detected pulse width is smaller than the expected pulse width in step (a), and setting a value obtained by subtracting a predetermined value from the currently expected pulse width as the next expected pulse width; (c) setting the expected pulse width as the scanning start signal (an edge signal mixed) if the detected pulse width is greater than or equal to the expected pulse width in step (a) and in order to set the next expected pulse width, determining whether the counted value of a pulse is smaller than an offset value or greater than or equal to the offset value; (d) setting a value obtained by subtracting a predetermined value from the currently expected pulse width as the next expected pulse width if the pulse counted value is smaller than the offset value as determined in step (c); and (e) setting a value obtained by adding a predetermined value to the currently expected pulse width as the next expected pulse width if the pulse counted value is greater than or equal to the offset value as determined in the step (c).

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENT

Figure 1:
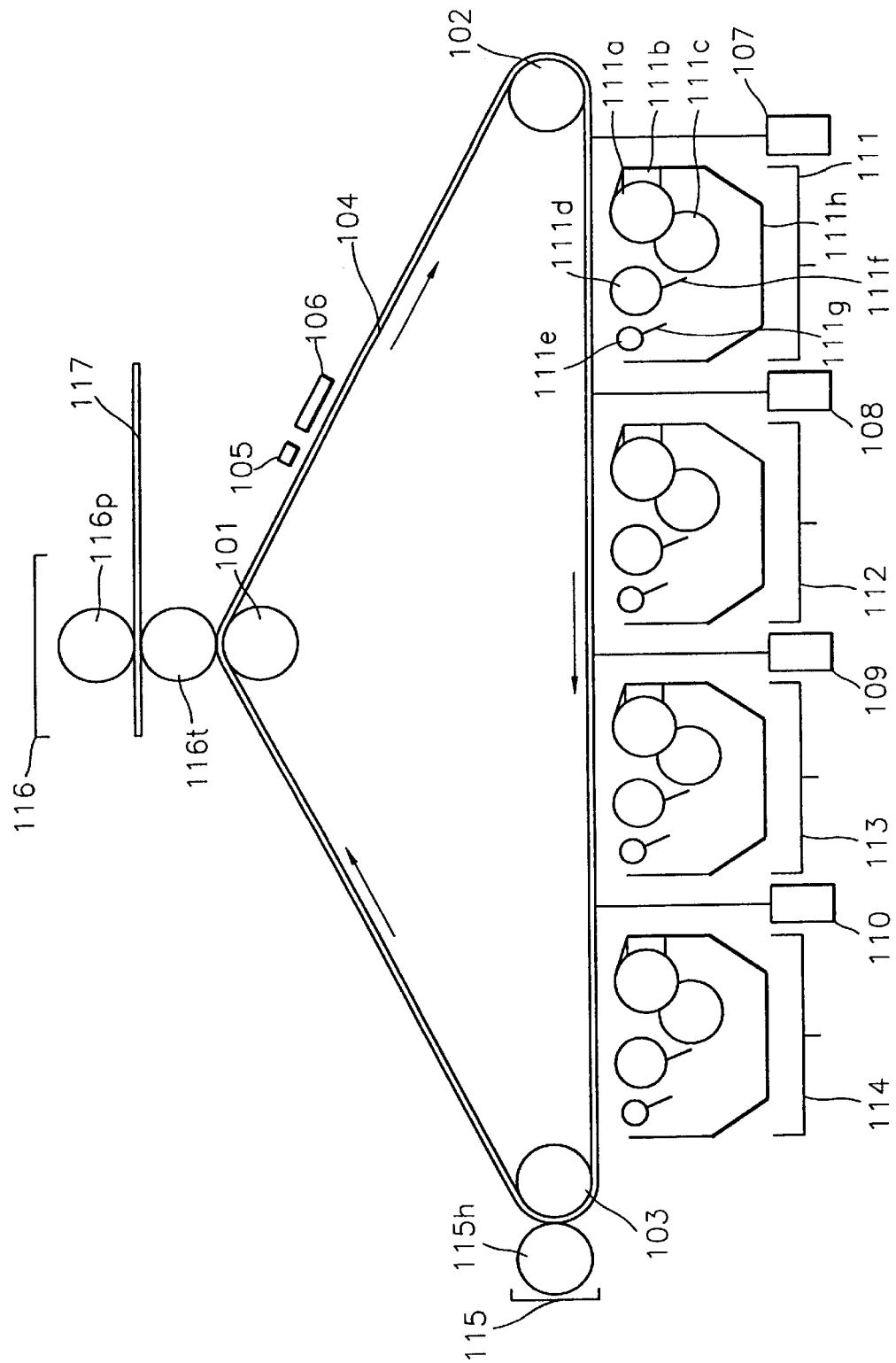
FIG. 1 is a schematic diagram of a general image forming apparatus.
Figure 2:
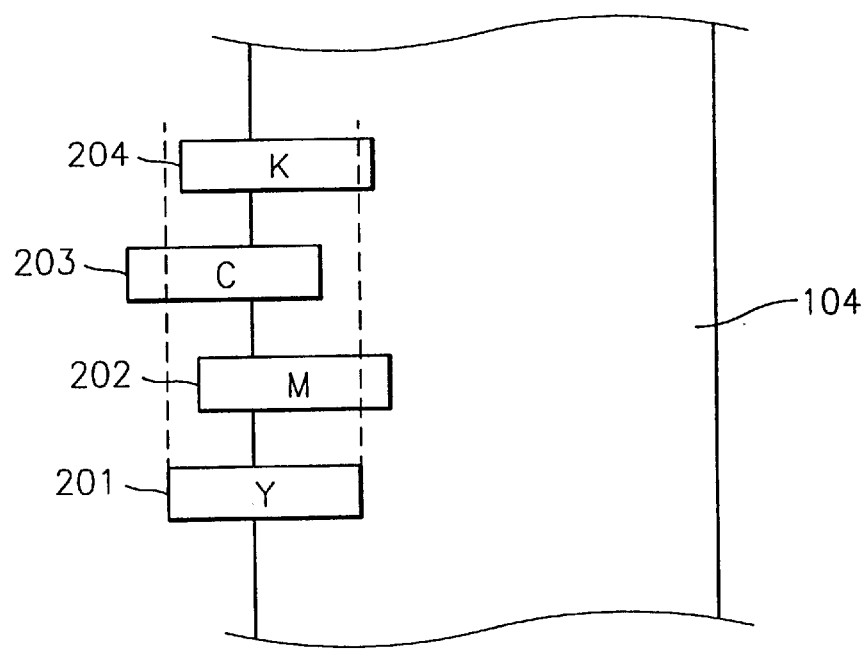
FIG. 2 illustrates the state of the arrangement of the respective Y-, M-, C- and K-belt edge detectors misaligned in the image forming apparatus shown in FIG. 1.
Figure 3:
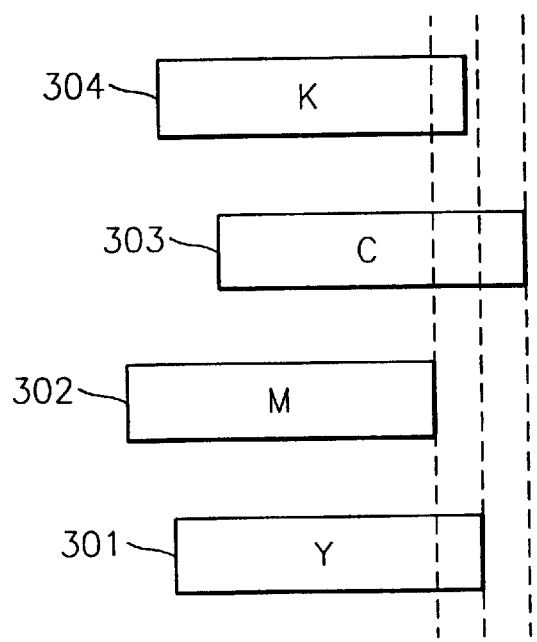
FIG. 3 illustrates the state of the arrangement of the respective Y-, M-, C- and K-belt scanners misaligned in the image forming apparatus shown in FIG. 1.
Figure 4:
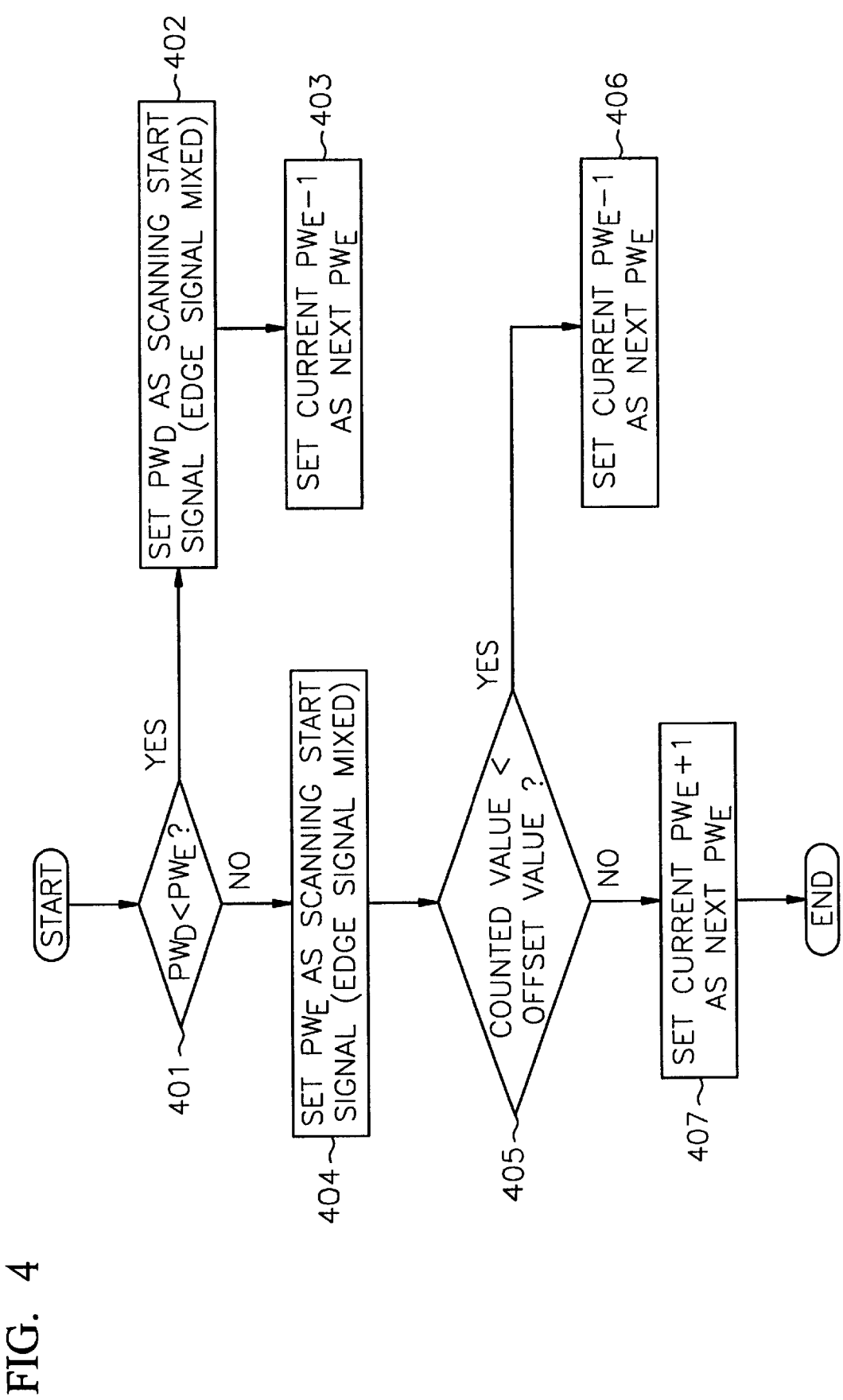
FIG. 4 is a flow chart illustrating a method for driving developing devices of an image forming apparatus according to the present invention.

Referring to FIG. 4, the color registration adjusting method in an image forming apparatus according to the present invention is implemented as follows. First, it is determined whether the detected pulse width ($PW_D$) of a pulse generated by a belt edge detector sensing the edge of a photoreceptor belt is smaller than the expected pulse width ($PW_E$) thereof (step 401). The pulse width detection is accomplished by counting pulse with a timer with a CPU (not shown). A clock signal from an oscillator (also not shown) is input as an interrupt to the CPU and the time counts the number of pulses received from the belt edge detector during each cycle of the clock to arrive at a counted value. The counted value is inversely proportional to the pulse width and the CPU calculates the pulse width based on the counted value and this inverse relationship.

If the detected pulse width ($PW_D$) is smaller than the expected pulse width ($PW_E$) in the step 401, the detected pulse width ($PW_D$) is set as a scanning start signal (an edge signal mixed) (step 402). A value obtained by subtracting 1 from the currently expected pulse width ($PW_E$) is then set as the next expected pulse width ($PW_E$) (step 403). If the detected pulse width ($PW_D$) is greater than or equal to the expected pulse width ($PW_E$) in the step 401, the expected pulse width ($PW_E$) is set as the scanning start signal (step 404). In order to set the next expected pulse width ($PW_E$), it is first determined whether the counted value of a pulse is smaller than an offset value which is a value for correcting differences among the start positions of the respective Y-, M-, C- and K-scanners (step 405). As discussed previously, this counted value is determined by the CPU (not shown) in which the timer (also not shown) receives the generated pulse and counts the pulse input to determine the pulse counted value. If the pulse counted value is smaller than the offset value in step 405, a value obtained by subtracting 1 from the currently expected pulse width ($PW_E$) is set as the next expected pulse width ($PW_E$) (step 406). If the pulse counted value is greater than or equal to the offset value in step 405, a value obtained by adding 1 to the currently expected pulse width ($PW_E$) is set as the next expected pulse width ($PW_E$) (step 407).

Throughout the above-described sequence, the edges of the photoreceptor belt are within the detection range of a photodetector (not shown) within each of the belt edge detectors. The expected pulse width ($PW_E$) is automatically adjusted to be smaller than the detected pulse width ($PW_D$) wherever the edge of the photoreceptor belt is positioned in the detection belt of the photodetector. Accordingly, mis-registration of color in the main scanning direction of a laser beam can be adjusted precisely.

As described above, in the color registration adjusting method according to the present invention, the detected pulse width and the expected pulse width for the edge of a photoreceptor belt are compared to each other and the result of the comparison is, in turn, used in setting a scanning start signal (an edge signal mixed). Particularly, since some of the next expected pulse widths are determined by comparing the pulse counted value and offset value, the mis-registration of color in the main scanning direction of a laser beam can be adjusted quantitatively.

While the present invention has been described and illustrated with reference to a preferred embodiment thereof, it is to be readily understood that the present invention is not limited to the embodiment, and various changes and modifications can be made therein without departing from the spirit and scope of the invention defined in the appended claims.

What is claimed is:

1. A color registration adjusting method in an image forming apparatus comprising the steps of:
   (a) determining whether a detected pulse width for the edge of a photoreceptor belt is smaller than an expected pulse width thereof;
   (b) setting the detected pulse width as a scanning start signal (an edge signal mixed) when the detected pulse width is smaller than the expected pulse width in step (a) and setting a value obtained by subtracting a predetermined value from the expected pulse width as a next expected pulse width;
   (c) setting the expected pulse width as the scanning start signal when the detected pulse width is greater than or equal to the expected pulse width in step (a) and determining whether a counted value of a pulse is smaller than an offset value;
   (d) setting a value obtained by subtracting a predetermined value from the expected pulse width as the next expected pulse width when the pulse counted value is smaller than the offset value in step (c); and
   (e) setting a value obtained by adding a predetermined value to the expected pulse width as the next expected pulse width when the pulse counted value is greater than or equal to the offset value in the step (c).

2. The method according to claim 1, wherein a value obtained by subtracting 1 from the expected pulse width is set as the next expected pulse width in step (b).

3. The method according to claim 1, wherein a value obtained by subtracting 1 from the expected pulse width is set as the next expected pulse width in step (d).

4. The method according to claim 1, wherein a value obtained by adding 1 to the expected pulse width is set as the next expected pulse width in step (e).

* * * * *